United States Patent
Inoue et al.

(10) Patent No.: US 8,931,264 B2
(45) Date of Patent: Jan. 13, 2015

(54) EXHAUST GAS PROCESSING DEVICE FOR DIESEL ENGINE

(75) Inventors: Katsushi Inoue, Sakai (JP); Yuuki Ishii, Sakai (JP); Yongchol Lee, Sakai (JP); Tomohiro Ninomiya, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 0 days.

(21) Appl. No.: 13/982,887

(22) PCT Filed: Jan. 26, 2012

(86) PCT No.: PCT/JP2012/051608
§ 371 (c)(1),
(2), (4) Date: Jul. 31, 2013

(87) PCT Pub. No.: WO2012/105396
PCT Pub. Date: Aug. 9, 2012

(65) Prior Publication Data
US 2013/0305694 A1 Nov. 21, 2013

(30) Foreign Application Priority Data
Feb. 2, 2011 (JP) .................. 2011-020386

(51) Int. Cl.
*F01N 3/00* (2006.01)
*F01N 3/10* (2006.01)
(Continued)

(52) U.S. Cl.
CPC ............ *F01N 3/10* (2013.01); *F02D 41/029* (2013.01); *F01N 9/002* (2013.01); *F01N 9/005* (2013.01);
(Continued)

(58) Field of Classification Search
CPC ....... F02D 41/029; F01N 9/002; F01N 9/005; F01N 3/035; F01N 3/10
USPC .......................... 60/277, 281, 295
See application file for complete search history.

(56) References Cited

U.S. PATENT DOCUMENTS

2006/0225411 A1* 10/2006 Kanazawa et al. ............ 60/299
2007/0144146 A1* 6/2007 Kusatsugu .................... 60/277
(Continued)

FOREIGN PATENT DOCUMENTS

JP 2003-184536 A 7/2003
JP 2005-113752 A 4/2005
(Continued)

OTHER PUBLICATIONS

English translation of Japanese Patent Application Publication No. JP 2003-184536 (Jul. 3, 2003).*
(Continued)

*Primary Examiner* — Thomas Denion
*Assistant Examiner* — Jason Shanske
(74) *Attorney, Agent, or Firm* — Panitch Schwarze Belisario & Nadel LLP

(57) ABSTRACT

An exhaust gas processing device for a diesel engine includes a DPF, a PM deposition amount estimating unit for PM deposited in the DPF, a DPF regenerating unit, a DPF regeneration control unit, a storage unit, an acceleration regeneration request information notifying unit, an acceleration regeneration start operating unit, and a mode selecting unit. When a normal regeneration process is selected, the time at which acceleration regeneration request determination reserve period T1 elapses from the start of the normal regeneration process without the end of the normal regeneration process is time T2 for acceleration regeneration request determination, at which time, if the PM deposition amount estimation value is greater or equal to acceleration regeneration request determination value J2, it is determined that there is the acceleration regeneration request. The DPF regeneration control unit allows the acceleration regeneration request information notifying unit to start notification of the acceleration regeneration request information.

10 Claims, 8 Drawing Sheets

(51) Int. Cl.
  *F02D 41/02* (2006.01)
  *F01N 9/00* (2006.01)
  *F01N 3/023* (2006.01)
  *F01N 3/035* (2006.01)
  *F02D 41/14* (2006.01)
  *F02D 41/40* (2006.01)

(52) U.S. Cl.
  CPC .............. *F01N 3/023* (2013.01); *F01N 3/035* (2013.01); *F02D 2200/0812* (2013.01); *Y02T 10/47* (2013.01); *F01N 2900/1606* (2013.01); *F02D 41/1446* (2013.01); *F02D 41/405* (2013.01)
  USPC .................................. 60/295; 60/277; 60/281

(56) References Cited

U.S. PATENT DOCUMENTS

| | | | |
|---|---|---|---|
| 2008/0307773 A1* | 12/2008 | Kogo | 60/286 |
| 2009/0183495 A1* | 7/2009 | Onodera et al. | 60/286 |
| 2010/0018186 A1* | 1/2010 | Shibata et al. | 60/277 |
| 2010/0024395 A1* | 2/2010 | Gotou et al. | 60/277 |
| 2010/0042307 A1* | 2/2010 | Otsubo et al. | 701/103 |
| 2010/0089035 A1* | 4/2010 | Kamiya et al. | 60/277 |
| 2010/0095656 A1* | 4/2010 | Kamiya et al. | 60/287 |
| 2010/0122522 A1* | 5/2010 | Tsukada et al. | 60/284 |
| 2011/0004559 A1* | 1/2011 | Shibamori et al. | 705/307 |

FOREIGN PATENT DOCUMENTS

| | | |
|---|---|---|
| JP | 2005-155444 A | 6/2005 |
| JP | 2005-299403 A | 10/2005 |
| JP | 2010-270699 A | 12/2010 |
| JP | 2011-007105 A | 1/2011 |
| JP | 2011-014003 A | 1/2011 |

OTHER PUBLICATIONS

Int'l Search Report issued Apr. 17, 2012 in Int'l Application No. PCT/JP2012/051608.

Office Action issued May 7, 2014 in JP Application No. 2011-020386.

* cited by examiner what is claimed is:

EXHAUST GAS PROCESSING DEVICE FOR DIESEL ENGINE

CROSS-REFERENCE TO RELATED APPLICATION

This application is a Section 371 of International Application No. PCT/JP2012/051608, filed Jan. 26, 2012, which was published in the Japanese language on Aug. 9, 2012, under International Publication No. WO 2012/105396 A1, and the disclosure of which is incorporated herein by reference.

TECHNICAL FIELD

The present invention relates to an exhaust gas processing device for a diesel engine. More specifically, the present invention relates to an exhaust gas processing device for a diesel engine, which can suppress fuel consumption deterioration and output reduction.

In the terms of the specification and claims, a DPF means a diesel particulate filter, a PM means a particulate matter in exhaust gas, and a DOC means an oxidation catalyst.

BACKGROUND ART

Conventionally, an exhaust gas processing device for a diesel engine includes a DPF, a PM deposition amount detecting unit for PM deposited in the DPF, a forcible regenerating unit, a forcible regeneration control unit, and a forcible regeneration notifying unit (for instance, see FIGS. 1 and 2 in Patent Document 1).

In this conventional technique, when the DPF captures the PM in exhaust gas to cause a first state in which a PM deposition amount detection value reaches a first set value, forcible regeneration at driving which operates the forcible regenerating unit at the time of driving a vehicle is automatically started to combust and remove the PM, and when the PM cannot be combusted and removed in the forcible regeneration at driving to cause a second state in which the PM deposition amount detection value is further increased to reach a second set value which is higher than the first set value, the forcible regeneration notifying unit is operated to notify that it is necessary to perform forcible regeneration at stopping which operates the forcible regenerating unit at stopping.

However, in this conventional technique, after the PM deposition amount detection value reaches the first set value to start the forcible regeneration at driving, unless the PM deposition amount detection value reaches the second set value which is higher than the first set value, the necessity of the forcible regeneration at stopping cannot be notified. So it is a problem.

PRIOR ART DOCUMENT

Patent Document

Patent Document 1: Japanese Patent Laid-open Publication No. 2005-113752

SUMMARY OF THE INVENTION

Problems to be Solved by the Invention

<<Problem>> Fuel consumption deterioration and output reduction can be caused.

After the PM deposition amount detection value reaches the first set value to start the forcible regeneration at driving, when the PM combustion removing speed and the PM depositing speed are countervailed to stay the PM deposition amount detection value near the first set value for a long time of period, the necessity of the forcible regeneration at stopping cannot be notified so that the forcible regeneration at driving is continued for a long time of period. Consequently, fuel consumption deterioration and output reduction can be caused.

An object of the present invention is to provide an exhaust gas processing device for a diesel engine, which can suppress fuel consumption deterioration and output reduction.

Solutions to the Problems

The subject matter of the invention is as follows.

As exemplified in FIG. 1, an exhaust gas processing device for a diesel engine includes a DPF (1); a PM deposition amount estimating unit (2) for PM deposited in the DPF (1); a DPF regenerating unit (3); a DPF regeneration control unit (4); a storage unit (5); an acceleration regeneration request information notifying unit (6); an acceleration regeneration start operating unit (7); and a mode selecting unit (41) which selects a permission mode and an inhibition mode of a normal regeneration process, wherein the storage unit (5) stores a plurality of determination values (J2) and (J3) for a PM deposition amount estimation value and an acceleration regeneration request determination reserve period (T1), which are exemplified in FIGS. 2 to 5, the plurality of determination values (J2) and (J3) including the acceleration regeneration request determination value (J2) and the normal regeneration start determination value (J3) which is higher than the acceleration regeneration request determination value (J2), the DPF regeneration control unit (4) comparing the PM deposition amount estimation value estimated by the PM deposition amount estimating unit (2) with the plurality of determination values (J2) and (J3), as exemplified in FIGS. 2, 4, and 5, when the permission mode of the normal regeneration process is selected by the mode selecting unit (41), when the PM deposition amount estimation value is increased to the normal regeneration start determination value (J3), the DPF regeneration control unit (4) automatically allows the DPF regenerating unit (3) to start the normal regeneration process in step (S3) for increasing a temperature of exhaust gas which passes through the DPF (1), as exemplified in FIGS. 2 and 5, a time at which the acceleration regeneration request determination reserve period (T1) elapses from start of the normal regeneration process in step (S3) without end of the normal regeneration process in step (S6) is a time (T2) for acceleration regeneration request determination, and when at the time (T2) for acceleration regeneration request determination, the PM deposition amount estimation value is equal to or more than the acceleration regeneration request determination value (J2), it is determined that there is an acceleration regeneration request so that the DPF regeneration control unit (4) allows the acceleration regeneration request information notifying unit (6) to start notification of acceleration regeneration request information in step (S10), as exemplified in FIGS. 2 and 5, when an acceleration regeneration start operation is performed by the acceleration regeneration start operating unit (7), the DPF regeneration control unit (4) allows the DPF regenerating unit (3) to switch the normal regeneration process to an acceleration regeneration process in step (S12) to increase the temperature of the exhaust gas which passes through the DPF (1) for accelerating a regenerating speed of the DPF (1) as compared with the normal regeneration process, as exemplified in FIGS. 3 to 5, when the inhibition mode of the normal regeneration process is selected by the mode selecting unit (41), the DPF regeneration control unit (4) allows the DPF regenerating unit (3) not to execute the normal regeneration process.

Effects of the Invention

<<Effect>> Fuel consumption deterioration and output reduction can be suppressed.

As illustrated in FIGS. 2 and 5, when the permission mode of the normal regeneration process is selected by the mode selecting unit (41), after the PM deposition amount estimation value is increased to a normal regeneration start determination value (J3) so that the DPF regeneration control unit (4) automatically starts the normal regeneration process in step (S3), even when the PM combustion removing speed and the PM depositing speed are countervailed to stay the PM deposition amount estimation value near the normal regeneration start determination value (J3), the notification of the acceleration regeneration request information is started in step (S10) at time (T2) for acceleration regeneration request determination after the elapse of the acceleration regeneration request determination reserve period (T1), so that the normal regeneration process can be immediately switched to the acceleration regeneration process in step (S12). Therefore, fuel consumption deterioration and output reduction due to the longer normal regeneration process can be suppressed.

<<Effect>> The inhibition of the normal regeneration process which is automatically started and continued can be selected.

As illustrated in FIGS. 3 to 5, when the inhibition mode of the normal regeneration process is selected by the mode selecting unit (41), the DPF regeneration control unit (4) allows the DPF regenerating unit (3) not to execute the normal regeneration process. Therefore, in a state in which the execution of the normal regeneration process is not appropriate, the inhibition of the normal regeneration process which is automatically started and continued can be selected.

The state in which the execution of the normal regeneration process is not appropriate is referred to as e.g., a state in which a machine on which this engine is mounted is required to hold exhaust gas to be more clean at low temperature in a room, park, or the like.

<<Effect>> The normal regeneration process after the elapse of the acceleration regeneration request determination reserve period can be prevented from being longer.

As illustrated in FIG. 2, when the permission mode of the normal regeneration process is selected by the mode selecting unit (41), during the acceleration regeneration request re-determination period (T3), the DPF regeneration control unit (4) ends the normal regeneration process in step (S20) or starts the notification of the acceleration regeneration request information in step (S10). Therefore, the normal regeneration process after the elapse of the acceleration regeneration request determination reserve period (T1) can be prevented from being longer.

<<Effect>> The acceleration regeneration process can be immediately started.

As exemplified in FIG. 3, when the inhibition mode of the normal regeneration process is selected by the mode selecting unit (41) before a time (T0) for the increase of the PM deposition amount estimation value to the normal regeneration start determination value (J3), the normal regeneration process is not started even when the PM deposition amount estimation value is increased to the normal regeneration start determination value (J3), and when before the elapse of the acceleration regeneration request determination reserve period (T1), the DPF regeneration control unit (4) allows the acceleration regeneration request information notifying unit (6) to start the notification of the acceleration regeneration request information in step (S24), and when the acceleration regeneration start operation is performed by the acceleration regeneration start operating unit (7), the DPF regeneration control unit (4) allows the DPF regenerating unit (3) to start the acceleration regeneration process in step (S26), so that the acceleration regeneration process can be immediately started in step (S26).

<<Effect>> The acceleration regeneration process can be immediately started.

As exemplified in FIG. 4, when the permission mode of the normal regeneration process is switched to the inhibition mode thereof by the mode selecting unit (41) without the end of the normal regeneration process in step (S6) during the acceleration regeneration request determination reserve period (T1), the DPF regeneration control unit (4) ends the normal regeneration process in step (S6)', and a predetermined time by the time the determination reserve period (T1) elapses from the time at which the mode is switched is a time (T5) for acceleration regeneration request determination, and when at the time (T5) for acceleration regeneration request determination, the PM deposition amount estimation value is equal to or more than the acceleration regeneration request determination value (J2), it is determined that there is the acceleration regeneration request so that the DPF regeneration control unit (4) allows the acceleration regeneration request information notifying unit (6) to start the notification of the acceleration regeneration request information in step (S10)', when the acceleration regeneration start operation is performed by the acceleration regeneration start operating unit (7), the DPF regeneration control unit (4) allows the DPF regenerating unit (3) to start the acceleration regeneration process in step (S12)'. Therefore the acceleration regeneration process can be immediately started.

<<Effect>> Even when the permission mode of the normal regeneration process is switched to the inhibition mode thereof, the acceleration regeneration process can be started without any trouble.

As illustrated in FIG. 5, when the permission mode of the normal regeneration process is switched to the inhibition mode thereof by the mode selecting unit (41) without the end of the normal regeneration process in step (S20) during the acceleration regeneration request re-determination period (T3), the DPF regeneration control unit (4) ends the normal regeneration process in step (S20)', and when the PM deposition amount estimation value is increased to an acceleration regeneration request determination value (J2) by the time re-determination period (T3) elapses from time (T6) for mode switching, it is determined that there is the acceleration regeneration request so that the DPF regeneration control unit (4) allows the acceleration regeneration request information notifying unit (6) to start the notification of the acceleration regeneration request information in step (S10)', and when the acceleration regeneration start operation is performed by the acceleration regeneration start operating unit (7), the DPF regeneration control unit (4) allows the DPF regenerating unit (3) to start the acceleration regeneration process in step (S12)'. Therefore, even when the permission mode of the normal regeneration process is switched to the inhibition mode thereof, the acceleration regeneration process can be started without any trouble.

<<Effect>> The acceleration regeneration process can be prevented from being longer.

As illustrated in FIGS. 2 to 5, when the DPF regeneration control unit (4) allows the DPF regenerating unit (3) to continue the acceleration regeneration process in step (S31), when the PM deposition amount estimation value is decreased to the acceleration regeneration request determination value (J2) which is the lower limit value of the acceleration regeneration request, the DPF regeneration control unit (4) ends the acceleration regeneration process in step (S29). Therefore, the acceleration regeneration process can be prevented from being continued for a long time of period.

In this case, even when the acceleration regeneration process is ended, the PM deposition amount estimation value is decreased to the lower limit value of the acceleration regeneration request. Therefore, clogging in the DPF (1) can be considerably eliminated, output reduction due to back pressure increase can be suppressed to some degree, and there is no trouble in the engine operation after the end of the acceleration regeneration process.

<<Effect>> The necessity of an emergency measure can be provoked.

As illustrated in FIGS. 2 to 5, when the PM deposition amount estimation value is increased to a DPF abnormality determination value (J4), the DPF regeneration control unit (4) allows the DPF abnormality information notifying unit (8) to start the notification of the DPF abnormality information in step (S33). Therefore, when abnormal PM deposition is caused, the necessity of an emergency measure, such as engine stop and DPF cleaning in a maintenance factory, can be invoked.

<<Effect>> The normal regeneration process can be prevented from being longer.

As illustrated in FIGS. 2, 4, and 5, when the normal regeneration process decreases the PM deposition amount estimation value to a normal regeneration end determination value (J1) the DPF regeneration control unit (4) ends the normal regeneration process in steps (S6) and (S20). Therefore, the normal regeneration process can be prevented from being longer.

<<Effect>> The acceleration regeneration process cannot trouble the driving and operation of the machine on which the engine is mounted.

The normal regeneration process is executed along with at least one of the driving and operation of the machine on which the engine is mounted, and the acceleration regeneration process is executed while both of the driving and operation of the machine on which the engine is mounted are stopped. Therefore, the acceleration regeneration process cannot trouble the driving and operation of the machine on which the engine is mounted.

<<Effect>> A common rail system is combined with a DOC to enable the regeneration of the DPF.

As illustrated in FIG. 1, the common rail system (9) is combined with the DOC (10) to enable the regeneration of the DPF (1).

EMBODIMENTS OF THE INVENTION

FIGS. 1 to 8 are drawings illustrating an exhaust gas processing device for a diesel engine according to an embodiment of the present invention. In this embodiment, an exhaust gas processing device for a multi-cylinder diesel engine will be described.

Figure 1:
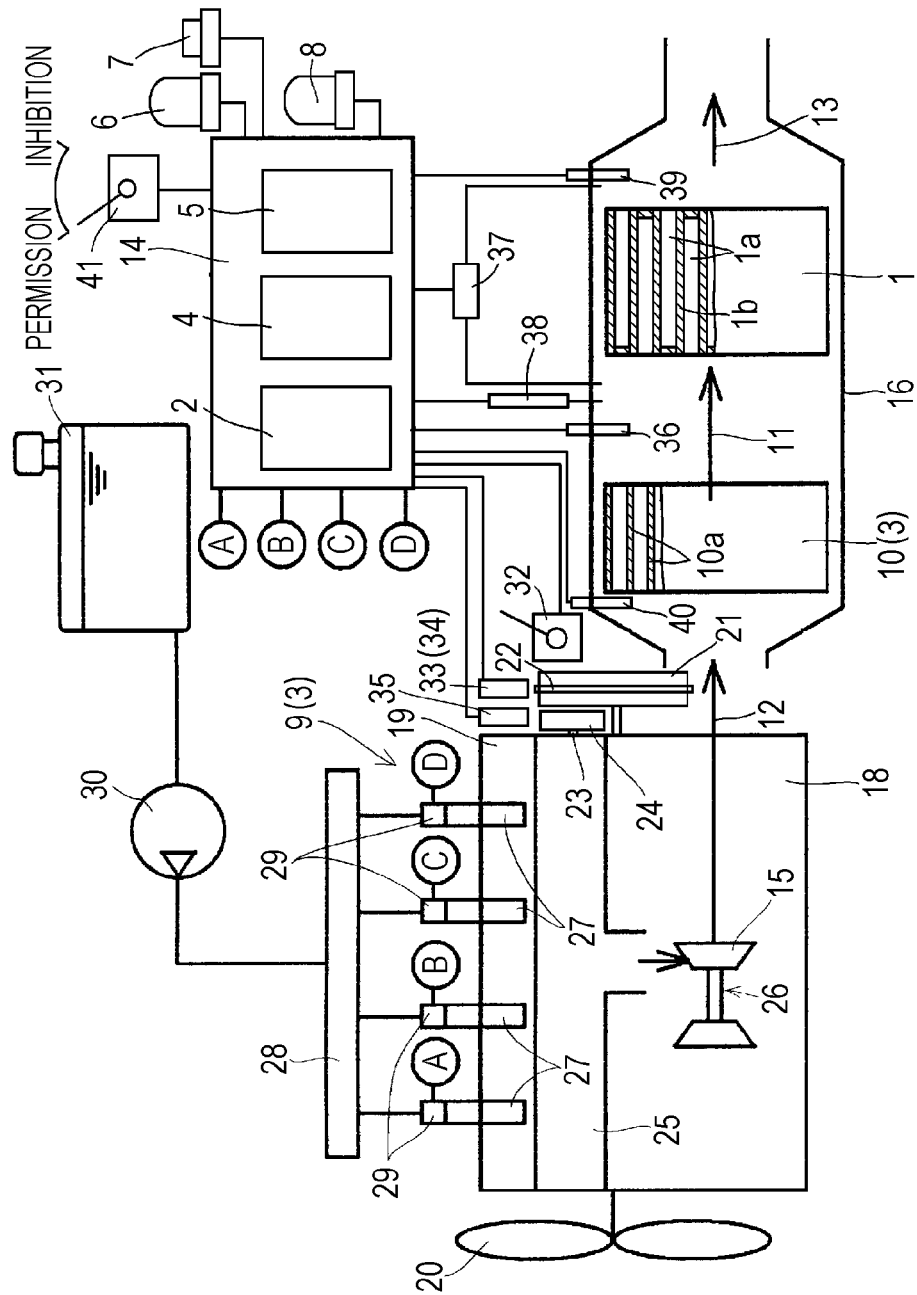
FIG. 1 is a schematic diagram of an exhaust gas processing device for a diesel engine according to an embodiment of the present invention.

The overview of a diesel engine shown in FIG. 1 is as follows.

A cylinder head (19) is assembled to the upper portion of a cylinder block (18). An engine cooling fan (20) is arranged in the front portion of the cylinder block (18). A flywheel (21) is arranged in the rear portion of the cylinder block (18). A rotor plate (22) is attached to the flywheel (21). In addition, a sensor plate (24) is attached to a valve camshaft (23), and is arranged in the rear portion of the cylinder block (18). An exhaust manifold (25) is arranged on one side of the cylinder head (19). A supercharger (26) is communicated with the exhaust manifold (25). A DPF case (16) accommodates a DPF (1) therein, and is arranged on the downstream side of a turbine (15) of the supercharger (26). The DPF case (16) also accommodates a DOC (10) therein. Each injector (27) is arranged for each cylinder in the cylinder head (19). The injector (27) is connected to a common rail (28). The injector (27) is provided with an electromagnetic valve (29). A fuel tank (31) is connected to the common rail (28) via a fuel supply pump (30).

A target engine rotating speed setting unit (32), an actual engine rotating speed detecting unit (33), a crank angle detecting unit (34), and a cylinder determining unit (35) are engaged with the electromagnetic valve (29) of the injector (27) via a control unit (14). The target engine rotating speed setting unit (32) is a potentiometer which outputs a target engine rotating speed, as a voltage value, from the set position of a speed control lever. The actual engine rotating speed detecting unit (33) and the crank angle detecting unit (34) are pickup coils which face the outer periphery of the rotor plate (22), and detect the number of teeth provided at constant intervals on the outer periphery of the rotor plate (22) to detect an actual engine rotating speed and a crank angle. The cylinder determining unit (35) is a sensor for determining the stroke state of the combustion cycle of each cylinder based on the detection of a projection provided on the sensor plate (24). The control unit (14) is an engine ECU. The ECU is the abbreviation of an electronic control unit.

The control unit (14) controls the valve open timing and the valve open continuation time of the electromagnetic valve (29) of the injector (27) so as to reduce the deviation between a target engine rotating speed and the actual engine rotating speed, and allows the injector (27) to perform fuel injection in a predetermined amount into a combustion chamber at a predetermined injection timing.

The configuration of the exhaust gas processing device is as follows.

As shown in FIG. 1, the exhaust gas processing device includes the DPF (1), a PM deposition amount estimating unit (2) for PM deposited in the DPF (1), a DPF regenerating unit (3), a DPF regeneration control unit (4), a storage unit (5), an acceleration regeneration request information notifying unit (6), an acceleration regeneration start operating unit (7), and a mode selecting unit (41) which selects a permission mode and an inhibition mode of a normal regeneration process.

As shown in FIG. 1, the DPF (1) is a wall-flow monolith which alternately seals the ends of adjacent cells (1a) of a ceramic honeycomb carrier. Exhaust gas passes through the inside of the cells (1a) and walls (1b) of the cells (1a) so that the PM is captured on the walls (1b) of the cells (1a).

The PM deposition amount estimating unit (2) is a predetermined computing unit of the engine ECU which is the control unit (14), and estimates a PM deposition amount from a previously experimentally determined map data based on an engine load, an engine rotating speed, a detected exhaust gas temperature by a DPF upstream side exhaust gas temperature sensor (36), an exhaust gas pressure on the DPF upstream side by a DPF upstream side exhaust gas pressure sensor (38), and the pressure difference between the upstream and downstream sides of the DPF (1) by a differential pressure sensor (37).

As shown in FIG. 1, the DPF regenerating unit (3) combines a common rail system (9) with the DOC (10) on the upstream side of the DPF (1). The normal regeneration process and an acceleration regeneration process mix uncombusted fuel into exhaust gas by post injection after main injection from the injector (27) of the common rail system (9), oxidize and combust the uncombusted fuel with oxygen in the exhaust gas by the DOC (10) to increase the temperature of exhaust gas (11) which passes through the DPF (1).

The DOC (10) has a flow-through configuration in which the oxidation catalyst is supported by the ceramic honeycomb carrier and both ends of each cell (10a) are opened, thereby passing exhaust gas (12) therein.

As shown in FIG. 1, when the detected temperature of the exhaust gas (12) on the DOC upstream side by a DOC upstream side exhaust gas temperature sensor (40) is lower than the activating temperature of the DOC (10), the DPF regeneration control unit (4) allows the injector (27) of the common rail system (9) to perform after-injection after the main injection and before the post injection or reduces the opening of a suction throttle, thereby increasing the temperature of the exhaust gas (12) to activate the DOC (10). When the detected temperature of exhaust gas (13) on the DPF downstream side by a DPF downstream side exhaust gas temperature sensor (39) is higher than a predetermined abnormality determination temperature, the DPF regeneration control unit (4) allows a DPF abnormality information notifying unit (8) to start the notification of DPF abnormality information, and at the same time, stops the post injection and reduces the injection amount of the post injection.

The DPF regenerating unit (3) may combine the injector which injects the fuel into an exhaust pipe with the DOC or include an electric heater arranged in an inlet of the DPF.

As shown in FIG. 1, the DPF regeneration control unit (4) is provided in the engine ECU which is the control unit (14).

The storage unit (5) is a memory provided in the engine ECU which is the control unit (4).

Figure 2:
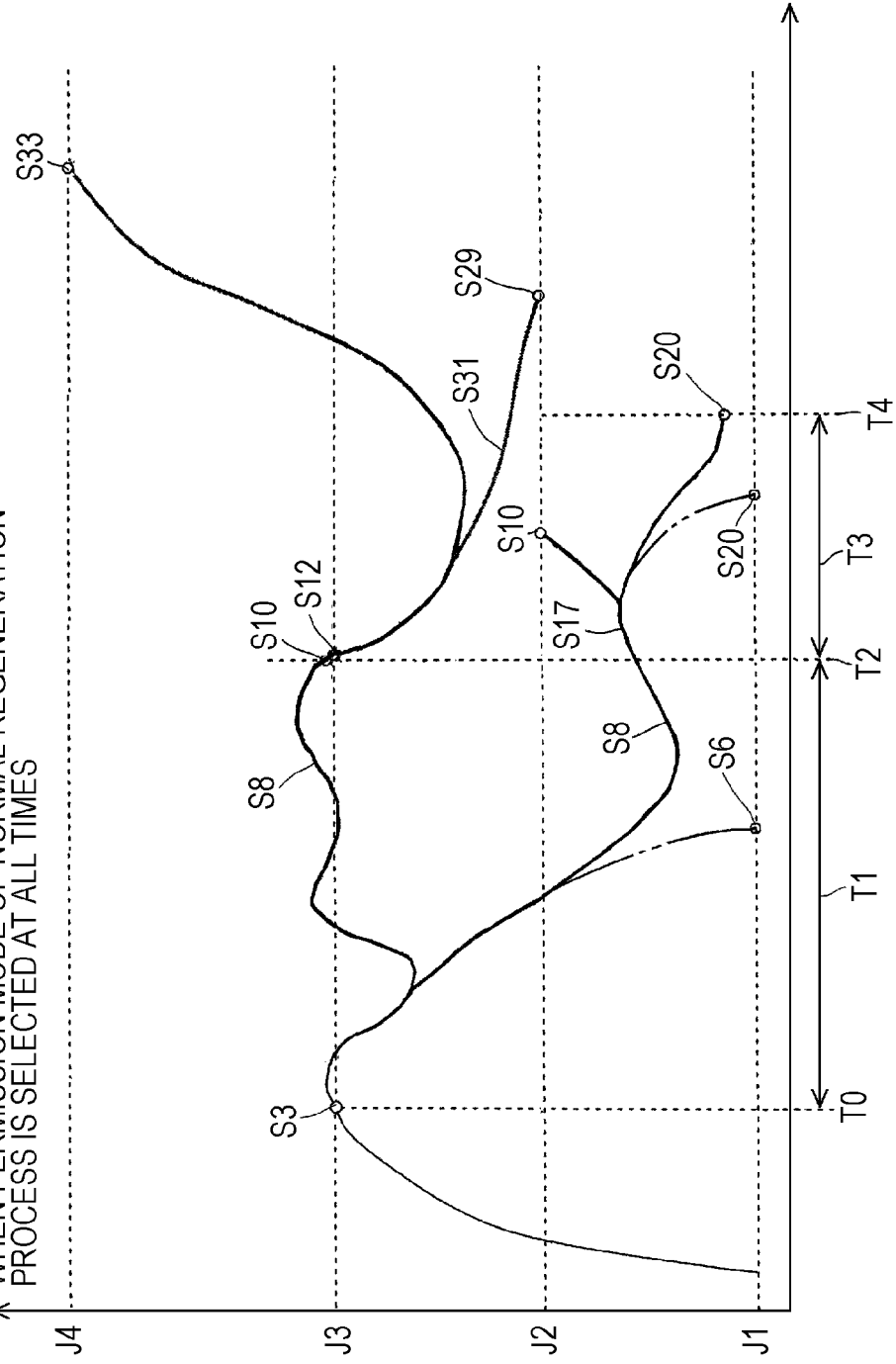
FIG. 2 is a time chart of a regeneration process by the exhaust gas processing device for a diesel engine according to the embodiment of the present invention, in which the permission mode of a normal regeneration process is selected at all times.

The storage unit (5) stores a plurality of determination values (J1), (J2), and (J3) for the PM deposition amount estimation value and an acceleration regeneration request determination reserve period (T1), which are shown in FIG. 2.

As shown in FIG. 2, the plurality of determination values (J1), (J2), and (J3) include the normal regeneration end determination value (J1), the acceleration regeneration request determination value (J2), and the normal regeneration start determination value (J3) in ascending order of value.

The DPF regeneration control unit (4) compares the PM deposition amount estimation value estimated by the PM deposition amount estimating unit (2) with the determination values (J1), (J2), and (J3).

As shown in FIG. 2, when the permission mode of the normal regeneration process is selected by the mode selecting unit (41), when the PM deposition amount estimation value is increased to the normal regeneration start determination value (J3), the DPF regeneration control unit (4) automatically allows the DPF regenerating unit (3) to start the normal regeneration process in step (S3) for increasing the temperature of the exhaust gas (11) which passes through the DPF (1).

As shown in FIG. 2, while the acceleration regeneration request determination reserve period (T1) elapses from the start of the normal regeneration process in step (S3), when the PM deposition amount estimation value is decreased to the normal regeneration end determination value (J1), the DPF regeneration control unit (4) ends the normal regeneration process in step (S6).

When the PM deposition amount estimation value is not decreased to the normal regeneration end determination value (J1), the DPF regeneration control unit (4) continues the normal regeneration process in step (S8).

As shown in FIG. 2, the time at which the acceleration regeneration request determination reserve period (T1) elapses from the start of the normal regeneration process in step (S3) without the end of the normal regeneration process in step (S6) (with the continuation of the normal regeneration process in step (S8)) is a time (T2) for acceleration regeneration request determination, and when at the time (T2) for acceleration regeneration request determination, the PM deposition amount estimation value is equal to or more than the acceleration regeneration request determination value (J2), it is determined that there is an acceleration regeneration request so that the DPF regeneration control unit (4) allows the acceleration regeneration request information notifying unit (6) to start the notification of the acceleration regeneration request information in step (S10).

As shown in FIG. 2, when an acceleration regeneration start operation is performed by the acceleration regeneration start operating unit (7), the DPF regeneration control unit (4) allows the DPF regenerating unit (3) to switch the normal regeneration process to the acceleration regeneration process in step (S12) to increase the temperature of the exhaust gas (11) which passes through the DPF (1) for accelerating the regenerating speed of the DPF (1) as compared with the normal regeneration process.

The acceleration regeneration process increases the injection amount of the main injection and the post injection as compared with the normal regeneration process to further increase the temperature of the exhaust gas (11), thereby accelerating the regenerating speed of the DPF (1).

As shown in FIG. 1, the acceleration regeneration request information notifying unit (6) is a lamp provided in a dashboard of a machine on which the diesel engine is mounted. The lamp is turned on to notify the acceleration regeneration request information.

The acceleration regeneration start operating unit (7) is an operating button provided in the dashboard. A driver or the like manually presses the operating button to perform the acceleration regeneration start operation.

The mode selecting unit (41) is an operating lever provided in the dashboard. The driver manually switches the operating lever to select the permission mode and the inhibition mode of the normal regeneration process.

The storage unit (5) stores an acceleration regeneration request re-determination period (T3) shown in FIG. 2. As shown in FIG. 2, when the permission mode of the normal regeneration process is selected by the mode selecting unit (41), when the PM deposition amount estimation value is lower than the acceleration regeneration request determination value (J2) at the time (T2) for acceleration regeneration request determination, it is determined that there is no acceleration regeneration request so that the DPF regeneration control unit (4) continues the normal regeneration process in step (S17) even during an acceleration regeneration request re-determination period (T3) following the time (T2) for acceleration regeneration request determination, and when the PM deposition amount estimation value is decreased to the normal regeneration end determination value (J1) without the end of the normal regeneration process in step (S20) during the acceleration regeneration request re-determination period (T3), the DPF regeneration control unit (4) ends the normal regeneration process in step (S20), and when the PM deposition amount estimation value is increased to the acceleration regeneration request determination value (J2), it is determined that there is the acceleration regeneration request so that the DPF regeneration control unit (4) allows the acceleration regeneration request information notifying unit (6) to start the notification of the acceleration regeneration request information in step (S10).

The time at which the acceleration regeneration request re-determination period (T3) elapses is a time (T4) for re-determination end, and when at the time (T4) for re-determination end, the DPF deposition amount estimation value is not increased to the acceleration regeneration request determination value (J2), the DPF regeneration control unit (4) ends the normal regeneration process in step (S20) even when the PM deposition amount estimation value is not decreased to the normal regeneration end determination value (J1).

As shown in FIG. 2, when the DPF regeneration control unit (4) allows the DPF regenerating unit (3) to continue the acceleration regeneration process in step (S31), when the PM deposition amount estimation value is decreased to the acceleration regeneration request determination value (J2) which is the lower limit value of the acceleration regeneration request, the DPF regeneration control unit (4) ends the acceleration regeneration process in step (S29).

As shown in FIG. 1, the exhaust gas processing device includes the DPF abnormality information notifying unit (8). The storage unit (5) stores a DPF abnormality determination value (J4) which is higher than the normal regeneration start determination value (J3) shown in FIG. 2. As shown in FIG. 2, when the PM deposition amount estimation value is increased to the DPF abnormality determination value (J4), the DPF regeneration control unit (4) allows the DPF abnormality information notifying unit (8) to start the notification of the DPF abnormality information in step (S33).

As shown in FIG. 1, the DPF abnormality information notifying unit (8) is a lamp provided in the dashboard of the machine on which the diesel engine is mounted. The lamp is turned on to notify the DPF abnormality information.

Figure 3:
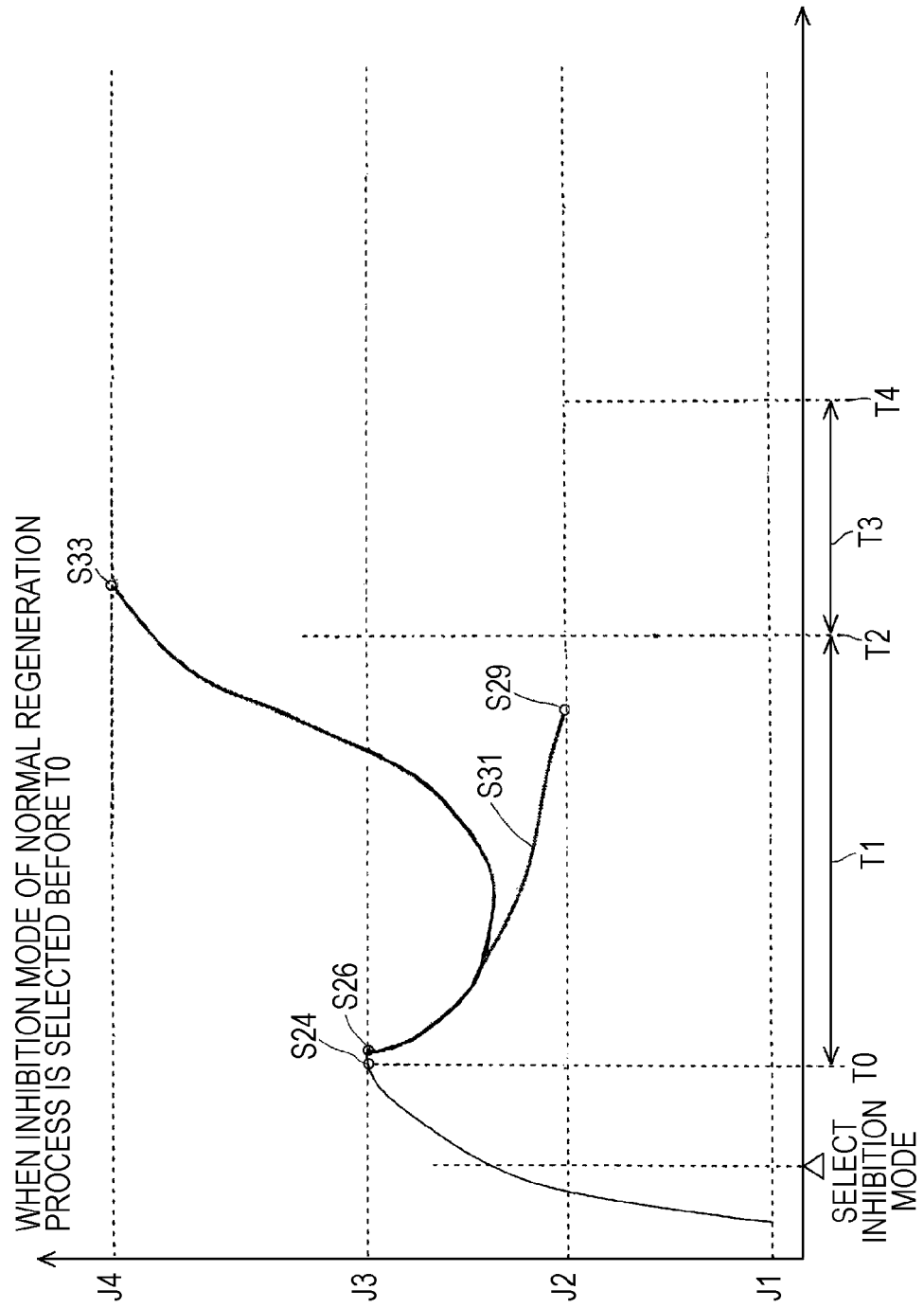
FIG. 3 is a time chart of the regeneration process by the exhaust gas processing device for a diesel engine according to the embodiment of the present invention, in which the inhibition mode of the normal regeneration process is selected before T0.
Figure 4:
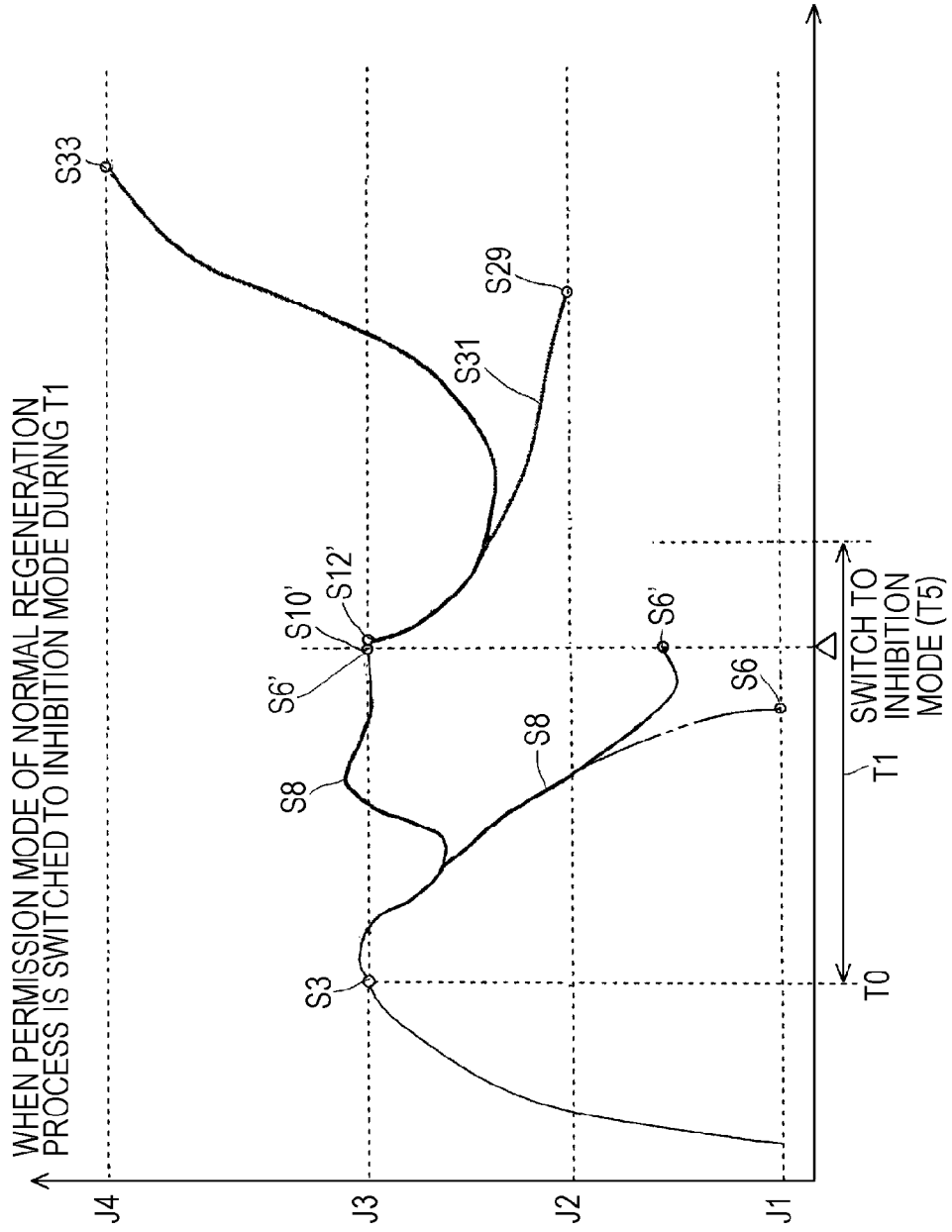
FIG. 4 is a time chart of the regeneration process by the exhaust gas processing device for a diesel engine according to the embodiment of the present invention, in which the permission mode of the normal regeneration process is switched to the inhibition mode thereof during T1.
Figure 5:
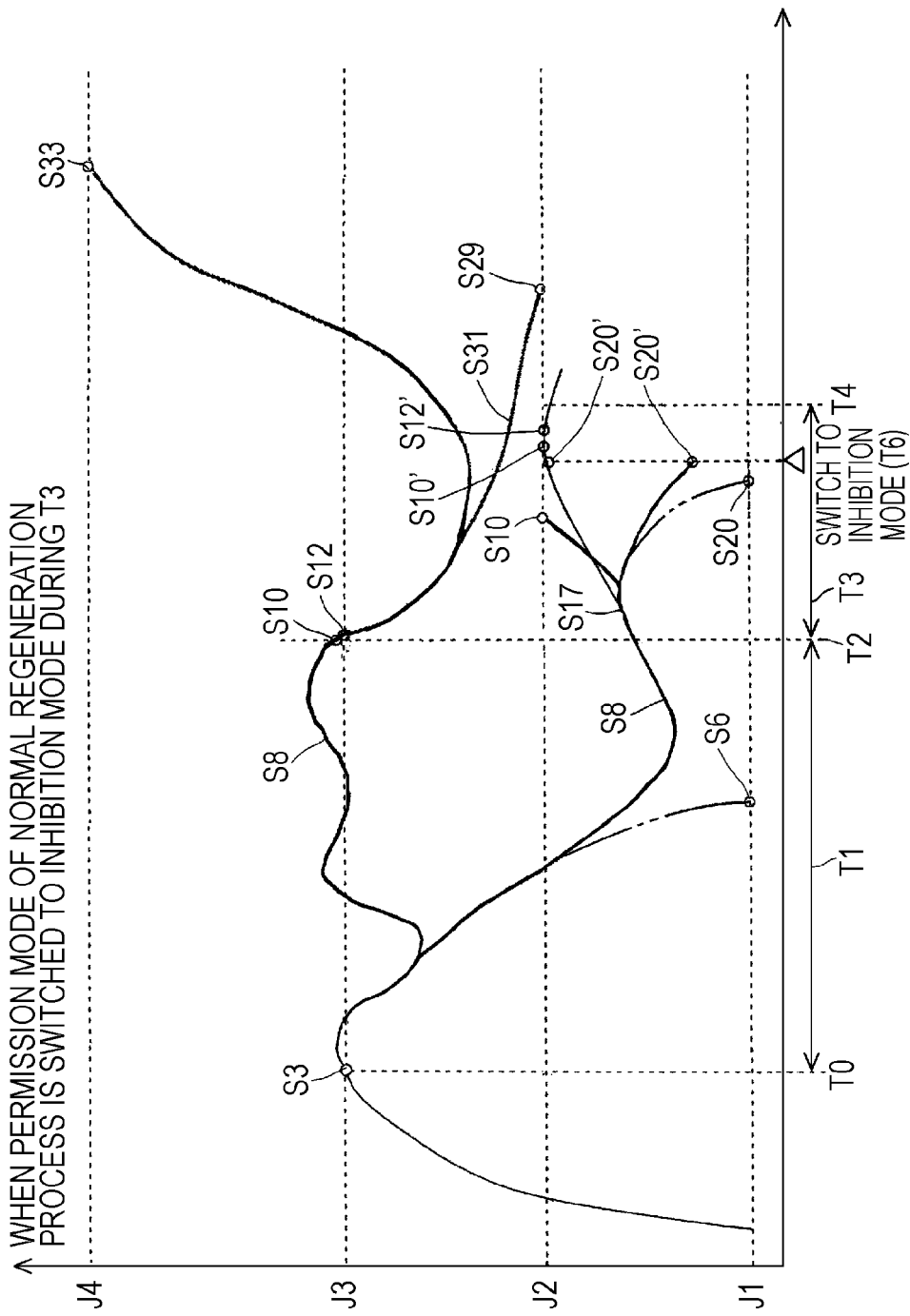
FIG. 5 is a time chart of the regeneration process by the exhaust gas processing device for a diesel engine according to the embodiment of the present invention, in which the permission mode of the normal regeneration process is switched to the inhibition mode thereof during T3.

As shown in FIGS. 3 to 5, when the inhibition mode of the normal regeneration process is selected by the mode selecting unit (41), the DPF regeneration control unit (4) allows the DPF regenerating unit (3) not to execute the normal regeneration process.

As shown in FIG. 3, when the inhibition mode of the normal regeneration process is selected by the mode selecting unit (41) before a time (T0) for the increase of the PM deposition amount estimation value to the normal regeneration start determination value (J3), the normal regeneration process is not started even when the PM deposition amount estimation value is increased to the normal regeneration start determination value (J3), and when before the elapse of the acceleration regeneration request determination reserve period (T1), the DPF regeneration control unit (4) allows the acceleration regeneration request information notifying unit (6) to start the notification of the acceleration regeneration request information in step (S24), and when the acceleration regeneration start operation is performed by the acceleration regeneration start operating unit (7), the DPF regeneration control unit (4) allows the DPF regenerating unit (3) to start the acceleration regeneration process in step (S26).

In FIG. 3, the time at which the notification of the acceleration regeneration request information is started in step (S24) is a time (T0) for the increase of the PM deposition amount estimation value to the normal regeneration Stan determination value (J3), but may be the time at which a predetermined time elapses from the time (T0).

As shown in FIG. 4, when the permission mode of the normal regeneration process is switched to the inhibition mode thereof by the mode selecting unit (41) without the end of the normal regeneration process in step (S6) (with the continuation of the normal regeneration process in step (S8)) during the acceleration regeneration request determination reserve period (T1), the DPF regeneration control unit (4) ends the normal regeneration process in step (S6)', and the time at which the mode is switched is a time (T5) for acceleration regeneration request determination, and when at the time (T5) for acceleration regeneration request determination, the PM deposition amount estimation value is equal to or more than the acceleration regeneration request determination value (J2), it is determined that there is the acceleration regeneration request so that the DPF regeneration control unit (4) allows the acceleration regeneration request information notifying unit (6) to start the notification of the acceleration regeneration request information in step (S10)'.

When the acceleration regeneration start operation is performed by the acceleration regeneration start operating unit (7), the DPF regeneration control unit (4) allows the DPF regenerating unit (3) to start the acceleration regeneration process in step (S12)'.

In this embodiment, the time at which the permission mode of the normal regeneration process is switched to the inhibition mode thereof is the time (T5) for acceleration regeneration request determination, but a predetermined time by the time the determination reserve period (T1) elapses from the time at which the permission mode of the normal regeneration process is switched to the inhibition mode thereof may be the time (T5) for acceleration regeneration request determination. A plurality of times (T5) for acceleration regeneration request determination may be provided.

As shown in FIG. 5, when the PM deposition amount estimation value is decreased to the normal regeneration end determination value (J1) during the elapse of the acceleration regeneration request re-determination period (T3), the DPF regeneration control unit (4) ends the normal regeneration process in step (S20).

When the PM deposition amount estimation value is not decreased to the normal regeneration end determination value (J1), the DPF regeneration control unit (4) continues the normal regeneration process in step (S17).

As shown in FIG. 5, when the permission mode of the normal regeneration process is switched to the inhibition mode thereof by the mode selecting unit (41) without the end of the normal regeneration process in step (S20) during the acceleration regeneration request re-determination period (T3), the DPF regeneration control unit (4) ends the normal regeneration process in step (S20)', and when the PM deposition amount estimation value is increased to the acceleration regeneration request determination value (J2) by the time the re-determination period (T3) elapses from a time (T6) for mode switching, it is determined that there is the acceleration regeneration request so that the DPF regeneration control unit (4) allows the acceleration regeneration request information notifying unit (6) to start the notification of the acceleration regeneration request information in step (S10)', and when the acceleration regeneration start operation is performed by the acceleration regeneration start operating unit (7), the DPF regeneration control unit (4) allows the DPF regenerating unit (3) to start the acceleration regeneration process in step (S12)'.

The diesel engine including the exhaust gas processing device is mounted on an agricultural machine such as a combine, and a constructing machine such as a backhoe. The normal regeneration process is executed along with at least one of the driving and operation of the machine on which the engine is mounted. The acceleration regeneration process is executed while both of the driving and operation of the machine on which the engine is mounted are stopped.

The flow of the regeneration process by the engine ECU which is the control unit is as follows.

Figure 6:
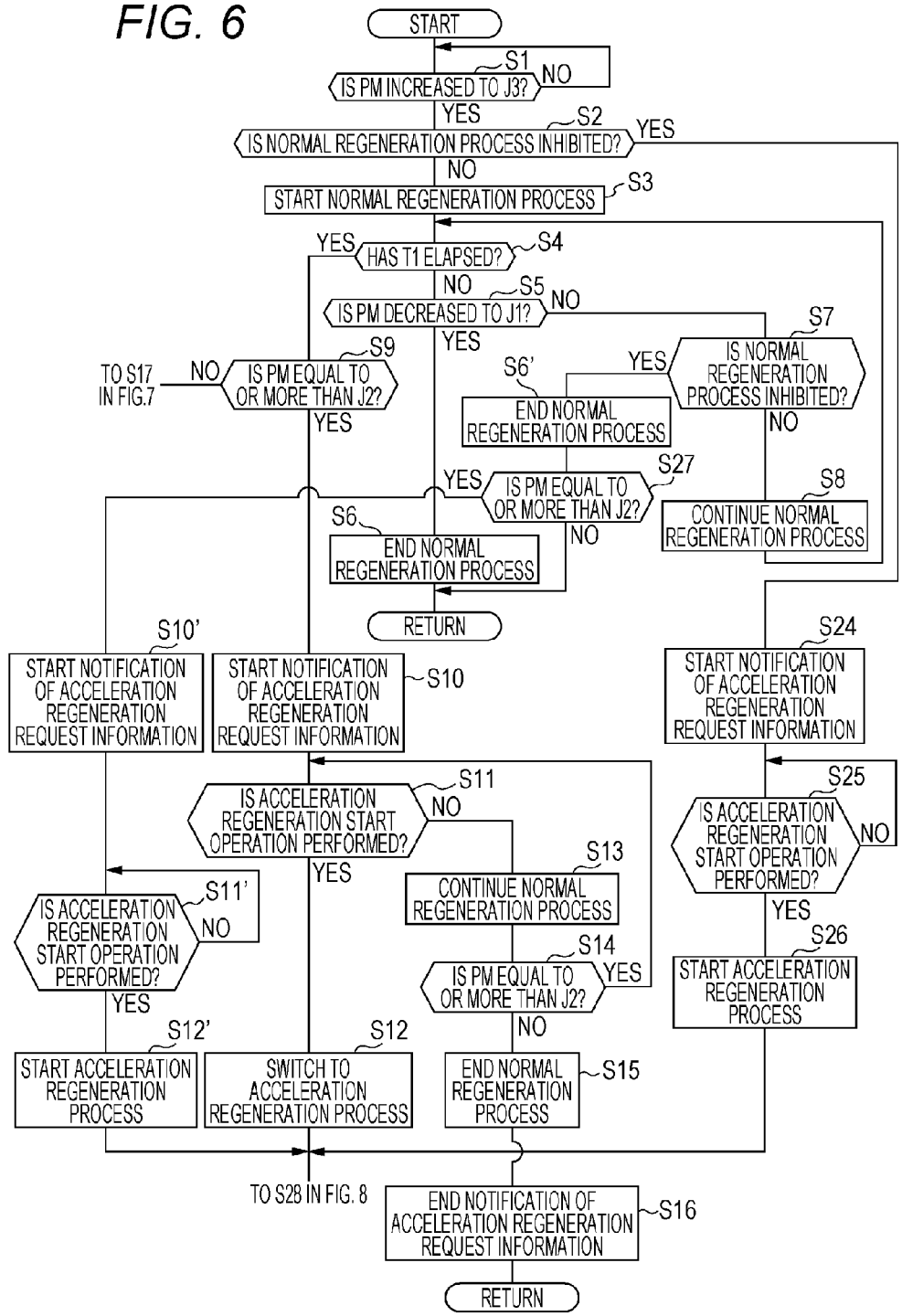
FIG. 6 is part of a flowchart of the regeneration process by the exhaust gas processing device for a diesel engine according to the embodiment of the present invention.

As shown in FIG. 6, it is determined in step (S1) whether or not the PM deposition amount estimation value is increased to the normal regeneration determination value (J3). If no, the determination is repeated. If yes, it is determined in step (S2) whether or not the inhibition mode of the normal regeneration process is selected. If no, that is, when the permission mode of the normal regeneration process is selected, the normal regeneration process is started in step (S3). The start of the normal regeneration process in step (S3) in FIGS. 2, 4, and 5 is executed through such steps.

Next, it is determined in step (S4) whether or not the acceleration regeneration request determination reserve period (T1) has elapsed from the start of the normal regeneration process. If no, it is determined in step (S5) whether or not the PM deposition amount estimation value is decreased to the normal regeneration end determination value (J1). If yes, the normal regeneration process is ended in step (S6) so that the routine returns to step (S1). If no in the determination in step (S5), it is determined in step (S7) whether or not the inhibition mode of the normal regeneration process is selected. If no, that is, when the permission mode of the normal regeneration process is selected, the normal regeneration process is continued in step (S8) so that the routine returns to step (S4). The end of the normal regeneration process in step (S6) and the continuation of the normal regeneration process in step (S8) during the determination reserve period (T1) in FIGS. 2, 4, and 5 are executed through such steps.

If yes in the determination in step (S4), it is determined in step (S9) whether or not the PM deposition amount estimation value is equal to or more than the acceleration regeneration request determination value (J2). If yes, the notification of the acceleration regeneration request information is started in step (S10). Then, it is determined in step (S11) whether or not the acceleration regeneration start operation is performed. If yes, the normal regeneration process is switched to the acceleration regeneration process in step (S12). The notification of the acceleration regeneration request information in step (S10) and the switching to the acceleration regeneration process in step (S12) thereafter at the time (T2) for determination in FIGS. 2 and 5 are executed through such steps.

If no in the determination in step (S11), the normal regeneration process is continued in step (S13). It is determined in step (S14) whether or not the PM deposition amount estimation value is equal to or more than the acceleration regeneration request determination value (J2). If no, the normal regeneration process is ended in step (S15), and the notification of the acceleration regeneration request information is ended in step (S16), so that the routine returns to step (S1). If yes in the determination in step (S14), the routine returns to step (S11).

Figure 7:
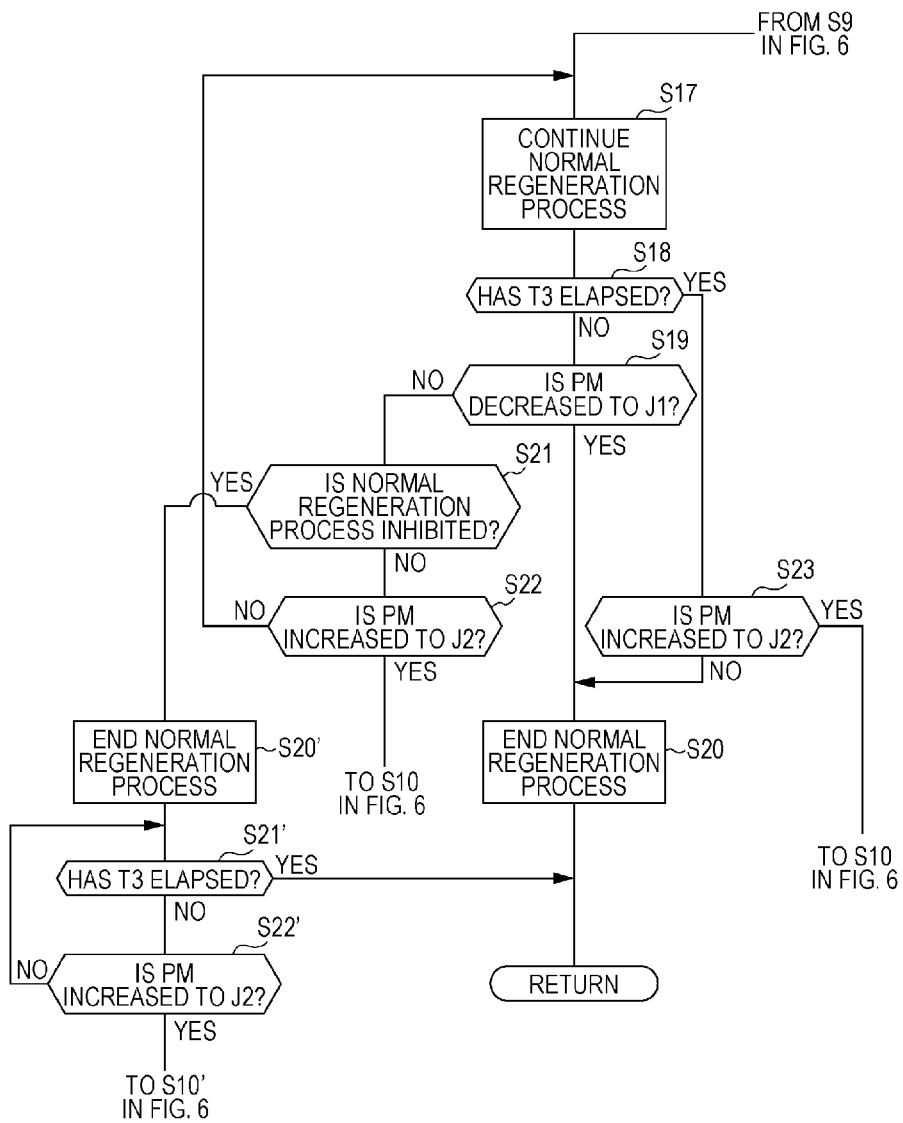
FIG. 7 is a flowchart continued from step (S9) of the flowchart shown in FIG. 6.

If no in the determination in step (S9) in FIG. 6, as shown in FIG. 7, the normal regeneration process is continued in step (S17). It is determined in step (S18) whether or not the acceleration regeneration request re-determination period (T3) has elapsed. If no, it is determined in step (S19) whether or not the PM deposition amount estimation value is decreased to the normal regeneration end determination value (J1). If yes, the normal regeneration process is ended in step (S20), so that the routine returns to step (S1). The continuation of the normal regeneration process in step (S17) and the end of the normal regeneration process in step (S20) during the re-determination period (T3) in FIGS. 2 and 5 are executed through such steps.

If no in the determination in step (S19), it is determined in step (S21) whether or not the inhibition mode of the normal regeneration process is selected. If no, that is, when the permission mode of the normal regeneration process is selected, it is determined in step (S22) whether or not the PM deposition amount estimation value is equal to or more than the acceleration regeneration request determination value (J2). If yes, the notification of the acceleration regeneration request information is started in step (S10). If no, the routine returns to step (S17). The start of the notification of the acceleration regeneration request information in step (S10) during the re-determination period (T3) in FIGS. 2 and 5 is executed through such steps.

If yes in the determination in step (S18), and if yes in the determination in step (S21), it is determined in step (S23) whether or not the PM deposition amount estimation value is equal to or more than the acceleration regeneration request determination value (J2). If no, the normal regeneration process is ended in step (S20), so that the routine returns to step (S1). The end of the normal regeneration process in step (S20) at the time (T4) for determination in FIG. 2 is executed through such steps.

If yes in the determination in step (S23), the notification of the acceleration regeneration request information is started in step (S10).

As shown in FIG. 6, if yes in the determination in step (S2), that is, when the inhibition mode of the normal regeneration process is selected, the notification of the acceleration regeneration request information is started in step (S24) to determine in step (S25) whether or not the acceleration regeneration start operation is performed. If no, the determination is repeated. If yes, the acceleration regeneration process is started in step (S26). The start of the notification of the acceleration regeneration request information in step (S24) and the start of the acceleration regeneration process in step (S26) in FIG. 3 are executed through such steps.

As shown in FIG. 6, if yes in the determination in step (S7), that is, when the inhibition mode of the normal regeneration process is selected during the acceleration regeneration request determination reserve period (T1), the normal regeneration process is ended in step (S6)' to determine in step (S27) whether or not the PM deposition amount estimation value is equal to or more than the acceleration regeneration request determination value (J2). If yes in the determination, the notification of the acceleration regeneration request information is started in step (S10)' to perform the acceleration regeneration start operation, so that it is determined yes in the determination in step (S11)' to start the acceleration regeneration process in step (S12)'.

In addition, if no in the determination in step (S27), the routine returns to step (S1).

The end of the normal regeneration process in step (S6)', the start of the notification of the acceleration regeneration request information in step (S10)', and the start of the acceleration regeneration process in step (S12)' thereafter at the time (T5) for acceleration regeneration request determination in FIG. 4 are executed through such steps.

As shown in FIG. 7, if yes in the determination in step (S21), that is, when the inhibition mode of the normal regeneration process is selected during the acceleration regeneration re-determination period (T3), the normal regeneration process is ended in step (S20)' to determine in step (S21)' whether or not the acceleration regeneration re-determination period (T3) has elapsed. If no in the determination, it is determined in step (S22)' whether or not the PM deposition amount estimation value is increased to the acceleration regeneration request determination value (J2). If yes in the determination, the notification of the acceleration regeneration request information is started in step (S10)' to perform the acceleration regeneration start operation, so that it is determined yes in the determination in step (S11)' to start the acceleration regeneration process in step (S12)'. If no in the determination in step (S22)', the routine returns to step (S21)'. If yes in the determination in step (S21)', the routine returns to step (S1).

The end of the normal regeneration process in step (S20)', the start of the notification of the acceleration regeneration request information in step (S10)', and the start of the acceleration regeneration process in step (S12)' thereafter by the time the re-determination period (T3) elapses from the time (T6) for mode switching in FIG. 5 are executed through such steps.

Figure 8:
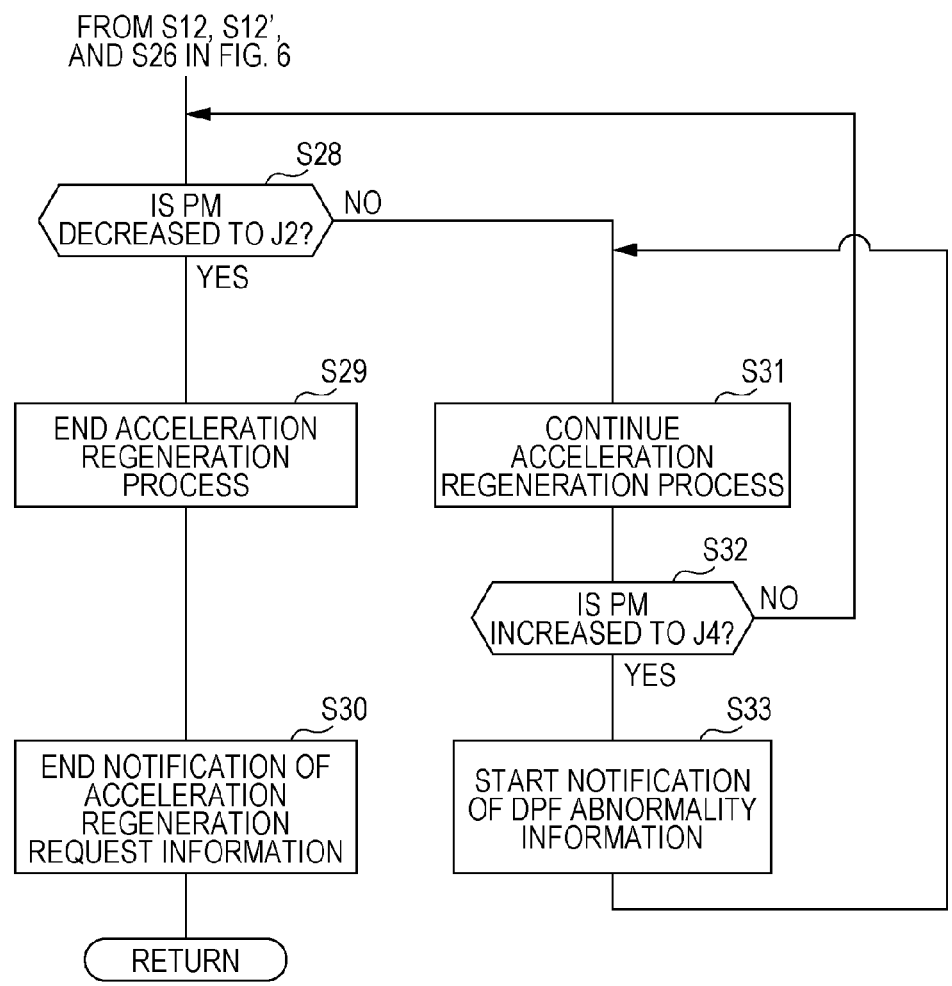
FIG. 8 is a flowchart continued from steps (S12), (S12)', and (S26) of the flowchart shown in FIG. 6.

After the normal regeneration process is switched to the acceleration regeneration process in step (S12) in FIG. 6, or after the acceleration regeneration process is started in step (S26), as shown in FIG. 8, it is determined in step (S28) whether or not the PM deposition amount estimation value is decreased to the acceleration regeneration request determination value (J2) which is the lower limit value of the acceleration regeneration request. If yes, the acceleration regeneration process is ended in step (S29) to end the notification of the acceleration regeneration request information in step (S30), so that the routine returns to step (S1). If no in the determination in step (S28), the acceleration regeneration process is continued in step (S31) to determine in step (S32) whether or not the PM deposition amount estimation value is increased to the DPF abnormality determination value (J4). If yes in the determination, the notification of the DPF abnormality information is started in step (S33), so that the routine returns to step (S31). If no in the determination in step (S32), the routine returns to step (S28).

The end of the acceleration regeneration process in step (S29), the continuation of the acceleration regeneration process in step (S31), and the start of the notification of the DPF abnormality information in step (S33) in FIGS. 2 to 5 are executed through such steps.

DESCRIPTION of REFERENCE SIGNS (1): DPF
(2): PM deposition amount estimating unit
(3): DPF regenerating unit
(4): DPF regeneration control unit
(5): Storage unit
(6): Acceleration regeneration request information notifying unit
(7): Acceleration regeneration start operating unit
(8): DPF abnormality information notifying unit
(9): Common rail system
(10): DOC
(11): Exhaust gas
(41): Mode selecting unit
(J1): Normal regeneration end determination value
(J2): Acceleration regeneration request determination value
(J3): Normal regeneration start determination value
(J4): DPF abnormality determination value
(T0): Time for the increase of the PM deposition amount estimation value to J3
(T1): Acceleration regeneration request determination reserve period
(T2): Time for acceleration regeneration request determination
(T3): Acceleration regeneration request re-determination period
(T4): Time for re-determination end
(T5): Time for acceleration regeneration request determination
(T6): Time for mode switching
(S3): Start normal regeneration process
(S6): End normal regeneration process
(S6)': End normal regeneration process
(S8): Continue normal regeneration process
(S10): Start notification of the acceleration regeneration request information
(S10)': Start notification of the acceleration regeneration request information
(S12): Switch to acceleration regeneration process
(S12)': Start acceleration regeneration process
(S17): Continue normal regeneration process
(S20): End normal regeneration process
(S20)': End normal regeneration process
(S22): Start notification of acceleration regeneration request information
(S24): Start notification of acceleration regeneration request information
(S26): Start acceleration regeneration process
(S29): End acceleration regeneration process
(S33): Start notification of DPF abnormality information

The invention claimed is:

1. An exhaust gas processing device for a diesel engine comprising:
   a DPF (1);
   a PM deposition amount estimating unit (2) for PM deposited in the DPF (1);
   a DPF regenerating unit (3);
   a DPF regeneration control unit (4);
   a storage unit (5);
   an acceleration regeneration request information notifying unit (6);
   an acceleration regeneration start operating unit (7); and
   a mode selecting unit (41) which selects a permission mode and an inhibition mode of a normal regeneration process, wherein the storage unit (5) stores a plurality of determination values (J2) and (J3) for a PM deposition amount estimation value and an acceleration regeneration request determination reserve period (T1), the plurality of determination values (J2) and (J3) including the acceleration regeneration request determination value (J2) and the normal regeneration start determination value (J3) which is higher than the acceleration regeneration request determination value (J2), the DPF regeneration control unit (4) comparing the PM deposition amount estimation value estimated by the PM deposition amount estimating unit (2) with the plurality of determination values (J2) and (J3), wherein when the permission mode of the normal regeneration process is selected by the mode selecting unit (41), and when the PM deposition amount estimation value is increased to the normal regeneration start determination value (J3), the DPF regeneration control unit (4) automatically allows the DPF regenerating unit (3) to start the normal regeneration process for increasing a temperature of exhaust gas which passes through the DPF (1), wherein a time at which the acceleration regeneration request determination reserve period (T1) elapses from start of the normal regeneration process without end of the normal regeneration process is a time (T2) for acceleration regeneration request determination, and when at the time (T2) for acceleration regeneration request determination, the PM deposition amount estimation value is equal to or more than the acceleration regeneration request determination value (J2), it is determined that there is an acceleration regeneration request so that the DPF regeneration control unit (4) allows the acceleration regeneration request information notifying unit (6) to start notification of acceleration regeneration request information, wherein when an acceleration regeneration start operation is performed by the acceleration regeneration start operating unit (7), the DPF regeneration control unit (4) allows the DPF regenerating unit (3) to switch the normal regeneration process to an acceleration regeneration process to increase the temperature of the exhaust gas which passes through the DPF (1) for accelerating a regenerating speed of the DPF (1) as compared with the normal regeneration process, wherein when the inhibition mode of the normal regeneration process is selected by the mode selecting unit (41), the DPF regeneration control unit (4) allows the DPF regenerating unit (3) not to execute the normal regeneration process.

2. The exhaust gas processing device for a diesel engine according to claim 1, wherein the storage unit (5) stores an acceleration regeneration request re-determination period (T3), and when the permission mode of the normal regeneration process is selected by the mode selecting unit (41), when the PM deposition amount estimation value is lower than the acceleration regeneration request determination value (J2) at the time (T2) for acceleration regeneration request determination, it is determined that there is no the acceleration regeneration request so that the DPF regeneration control unit (4) continues the normal regeneration process even during the acceleration regeneration request re-determination period (T3) following the time (T2) for acceleration regeneration request determination, and when the PM deposition amount estimation value is increased to the acceleration regeneration request determination value (J2) without the end of the normal regeneration process during the acceleration regeneration request re-determination period (T3), it is determined that there is the acceleration regeneration request so that the DPF regeneration control unit (4) allows the acceleration regeneration request information notifying unit (6) to start the notification of the acceleration regeneration request information, wherein a time at which the acceleration regeneration request re-determination period (T3) elapses is a time (T4) for re-determination end, and when at the time (T4) for re-determination end, the PM deposition amount estimation value is not increased to the acceleration regeneration request determination value (J2), the DPF regeneration control unit (4) ends the normal regeneration process.

3. The exhaust gas processing device for a diesel engine according to claim 1, wherein when the inhibition mode of the normal regeneration process is selected by the mode selecting unit (41) before a time (T0) for the increase of the PM deposition amount estimation value to the normal regeneration start determination value (J3), the normal regeneration process is not started even when the PM deposition amount estimation value is increased to the normal regeneration start determination value (J3), and when before the elapse of the acceleration regeneration request determination reserve period (T1), the DPF regeneration control unit (4) allows the acceleration regeneration request information notifying unit (6) to start the notification of the acceleration regeneration request information, and when the acceleration regeneration start operation is performed by the acceleration regeneration start operating unit (7), the DPF regeneration control unit (4) allows the DPF regenerating unit (3) to start the acceleration regeneration process.

4. The exhaust gas processing device for a diesel engine according to claim 2, wherein when the permission mode of the normal regeneration process is switched to the inhibition mode thereof by the mode selecting unit (41) without the end of the normal regeneration process during the acceleration regeneration request determination reserve period (T1), the DPF regeneration control unit (4) ends the normal regeneration process, and a predetermined time by the time the determination reserve period (T1) elapses from the time at which the mode is switched is a time (T5) for acceleration regeneration request determination, and when at the time (T5) for acceleration regeneration request determination, the PM deposition amount estimation value is equal to or more than the acceleration regeneration request determination value (J2), it is determined that there is the acceleration regeneration request so that the DPF regeneration control unit (4) allows the acceleration regeneration request information notifying unit (6) to start the notification of the acceleration regeneration request information, wherein when the acceleration regeneration start operation is performed by the acceleration regeneration start operating unit (7), the DPF regeneration control unit (4) allows the DPF regenerating unit (3) to start the acceleration regeneration process.

5. The exhaust gas processing device for a diesel engine according to claim 2, wherein when the permission mode of the normal regeneration process is switched to the inhibition mode thereof by the mode selecting unit (41) without the end of the normal regeneration process during the acceleration regeneration request re-determination period (T3), the DPF regeneration control unit (4) ends the normal regeneration process, and when the PM deposition amount estimation value is increased to the acceleration regeneration request determination value (J2) by the time the re-determination period (T3) elapses from a time (T6) for mode switching, it is determined that there is the acceleration regeneration request so that the DPF regeneration control unit (4) allows the acceleration regeneration request information notifying unit (6) to start the notification of the acceleration regeneration request information, and when the acceleration regeneration start operation is performed by the acceleration regeneration start operating unit (7), the DPF regeneration control unit (4) allows the DPF regenerating unit (3) to start the acceleration regeneration process.

6. The exhaust gas processing device for a diesel engine according to claim 1, wherein when the DPF regeneration control unit (4) allows the DPF regenerating unit (3) to continue the acceleration regeneration process, when the PM deposition amount estimation value is decreased to the acceleration regeneration request determination value (J2) which is the lower limit value of the acceleration regeneration request, the DPF regeneration control unit (4) ends the acceleration regeneration process.

7. The exhaust gas processing device for a diesel engine according to claim 1, further comprising a DPF abnormality information notifying unit (8), wherein the storage unit (5) stores a DPF abnormality determination value (J4) which is higher than the normal regeneration start determination value (J3), and when the PM deposition amount estimation value is increased to the DPF abnormality determination value (J4), the DPF regeneration control unit (4) allows the DPF abnormality information notifying unit (8) to start the notification of the DPF abnormality information.

8. The exhaust gas processing device for a diesel engine according to claim 1, wherein the storage unit (5) stores the normal regeneration end determination value (J1) which is lower than the acceleration regeneration request determination value (J2), wherein when the normal regeneration process decreases the PM deposition amount estimation value to the normal regeneration end determination value (J1), the DPF regeneration control unit (4) ends the normal regeneration process.

9. The exhaust gas processing device for a diesel engine according to claim 1, wherein the normal regeneration process is executed along with at least one of driving and operation of a machine on which an engine is mounted, and the acceleration regeneration process is executed while both of the driving and operation of the machine on which the engine is mounted are stopped.

10. The exhaust gas processing device for a diesel engine according to claim 1, wherein the DPF regenerating unit (3) combines a common rail system (9) with a DOC (10) on an upstream side of the DPF (1), and the normal regeneration process and the acceleration regeneration process mix uncombusted fuel into the exhaust gas by post injection after main injection from an injector (27) of the common rail system (9), oxidize and combust the uncombusted fuel with oxygen in the exhaust gas by the DOC (10) to increase the temperature of the exhaust gas which passes through the DPF (1).

* * * * *